(12) United States Patent
Awasthi

(10) Patent No.: US 11,823,138 B2
(45) Date of Patent: *Nov. 21, 2023

(54) SYSTEM, METHOD, AND COMPUTER PROGRAM PRODUCT FOR CONDUCTING A PAYMENT TRANSACTION INVOLVING PAYMENT ON DELIVERY

(71) Applicant: Visa International Service Association, San Francisco, CA (US)

(72) Inventor: Amitabh Awasthi, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,242

(22) Filed: Aug. 19, 2022

(65) Prior Publication Data

US 2022/0391857 A1 Dec. 8, 2022

Related U.S. Application Data

(63) Continuation of application No. 17/046,106, filed as application No. PCT/US2019/022281 on Mar. 14, 2019, now Pat. No. 11,488,119.

(Continued)

(51) Int. Cl.
*G06Q 20/00* (2012.01)
*G06Q 20/02* (2012.01)

(Continued)

(52) U.S. Cl.
CPC ............ *G06Q 20/02* (2013.01); *G06Q 20/085* (2013.01); *G06Q 20/202* (2013.01);
(Continued)

(58) Field of Classification Search
CPC . G06Q 20/085; G06Q 20/202; G06Q 20/3223
(Continued)

(56) References Cited

U.S. PATENT DOCUMENTS

2016/0110696 A1 4/2016 Angus et al.
2016/0335855 A1 11/2016 Ishibashi et al.
(Continued)

FOREIGN PATENT DOCUMENTS

JP 2003308443 A 10/2003

*Primary Examiner* — William E Rankins
(74) *Attorney, Agent, or Firm* — THE WEBB LAW FIRM

(57) ABSTRACT

Provided is a system for conducting a payment transaction involving payment on delivery in real-time. The system may include at least one processor programmed or configured to receive transaction data associated with a payment transaction involving a merchant and a customer at a location that is independent of a merchant location, determine a financial institution of a plurality of financial institutions based on the transaction data associated with the payment transaction, communicate data associated with a request for authorization of the payment transaction involving the merchant and the customer, receive an indication of authorization of the payment transaction involving the merchant and the customer, and communicate data associated with authorization of the payment transaction involving the merchant and the customer. A method and computer program product are also provided.

20 Claims, 4 Drawing Sheets

Related U.S. Application Data

(60) Provisional application No. 62/698,402, filed on Jul. 16, 2018, provisional application No. 62/654,706, filed on Apr. 9, 2018.

(51) Int. Cl.

| | | |
|---|---|---|
| *G06Q 20/08* | (2012.01) | |
| *G06Q 20/20* | (2012.01) | |
| *G06Q 20/32* | (2012.01) | |
| *G06Q 20/38* | (2012.01) | |
| *G06Q 20/40* | (2012.01) | |
| *G06Q 40/02* | (2023.01) | |

(52) U.S. Cl.
CPC ..... *G06Q 20/3223* (2013.01); *G06Q 20/3829* (2013.01); *G06Q 20/4014* (2013.01); *G06Q 40/02* (2013.01); *G06Q 2220/00* (2013.01)

(58) Field of Classification Search
USPC ...................................... 705/35, 71
See application file for complete search history.

(56) References Cited

U.S. PATENT DOCUMENTS

| | | |
|---|---|---|
| 2017/0083906 A1 | 3/2017 | Gaur et al. |
| 2017/0330181 A1* | 11/2017 | Ortiz ................. G06Q 20/3223 |
| 2018/0253704 A1* | 9/2018 | Unnerstall ........... G06Q 20/385 |
| 2019/0197555 A1* | 6/2019 | Gupta .................... G06Q 20/12 |
| 2020/0090165 A1* | 3/2020 | Kurien ................. G06Q 20/202 |

* cited by examiner

SYSTEM, METHOD, AND COMPUTER PROGRAM PRODUCT FOR CONDUCTING A PAYMENT TRANSACTION INVOLVING PAYMENT ON DELIVERY

CROSS-REFERENCE TO RELATED APPLICATIONS

This application is a continuation application of U.S. patent application Ser. No. 17/046,106, filed Mar. 14, 2019, which is the United States national phase of International Application No. PCT/US2019/022281, filed Mar. 14, 2019 and claims priority to U.S. Provisional Patent Application No. 62/654,706, filed Apr. 9, 2018, and U.S. Provisional Patent Application No. 62/698,402, filed Jul. 16, 2018, which are incorporated herein by reference in their entirety.

BACKGROUND

1. Technical Field

This present disclosure relates generally to systems, devices, products, apparatus, and methods for conducting a payment transaction involving payment on delivery, and in some non-limiting embodiments or aspects, to a system, product, and method associated with a mobile payment processing platform for conducting a payment transaction involving payment on delivery at a location independent of a merchant location.

2. Technical Considerations

A point-of-sale (POS) device (e.g., a POS terminal, a POS machine, and/or the like) may be an electronic device that is used to process payment transactions at a merchant location (e.g., a retail location, a store, and/or the like). For example, a POS device may be used to receive information based on reading a customer's credit card or debit card, determine whether electronic funds in a customer's account associated with the customer's credit card or debit card are sufficient, account for a transfer of the electronic funds from the customer's account to a merchant's account, and store data associated with the payment transaction after processing of the payment transaction is complete.

A merchant (e.g., an e-businesses merchant, an online retailer, a traditional brick and mortar retailer, and/or the like) may use a POS device associated with the merchant to conduct a payment transaction involving the merchant and a customer. In some examples, a merchant may use a mobile-POS (MPOS) device (e.g., a portable POS device) to conduct a payment transaction involving the merchant and a customer at a location that is independent of a merchant location (e.g., a location that is outside of a retail store of the merchant). In such an example, the MPOS device may communicate with a payment gateway to process the payment transaction for the merchant.

However, an MPOS device may be required to be associated with a merchant (e.g., assigned to a merchant). In this way, an entity that is not affiliated with the merchant may not be able to conduct a payment transaction (e.g., a payment transaction involving a payment on delivery, a payment transaction involving cash on delivery, a payment transaction involving collect on delivery, and/or the like) for the merchant using the MPOS device. In addition, an entity that is not affiliated with a first merchant or a second merchant may not be able to conduct a payment transaction involving a payment on delivery (e.g., cash on delivery, collect on delivery, and/or the like) for the first merchant or the second merchant using the MPOS device.

Additionally, an entity (e.g., a logistics entity, a delivery entity, a courier, a sales representative, and/or the like) that is hired by the merchant to provide goods and/or sell services associated with the merchant and accept payment for the goods and/or the services may not be able to conduct a payment transaction involving a payment on delivery for the merchant using the MPOS device in real-time. For example, the delivery entity may deliver a good provided by the merchant to a customer at a customer location (e.g., a customer's home) and the delivery entity may read a credit card of the customer using the MPOS device associated with the delivery entity. The MPOS device may not be able to process the payment transaction in real-time while the delivery entity is located at the customer location because the MPOS device may not be able to determine a financial institution associated with an account of the merchant from which to obtain authorization for the payment transaction. Instead, the MPOS device may process the payment transaction at the end of the day during a batch process in which a plurality of payment transactions are processed. In addition, the delivery entity may be forced to deliver the goods to the customer before obtaining authorization for the payment transaction between the customer and the merchant for the goods.

SUMMARY

Accordingly, improved systems, devices, products, apparatus, and/or methods for determining a category alignment of an account are disclosed.

According to some non-limiting embodiments or aspects, provided is a computer-implemented method for conducting a payment transaction involving payment on delivery in real-time. The method comprises receiving, with at least one processor, transaction data associated with a payment transaction involving a merchant and a customer at a location that is independent of a merchant location from an MPOS device; determining, with at least one processor, an identity of a financial institution from among a plurality of financial institutions based on the transaction data associated with the payment transaction, wherein the financial institution is associated with the merchant involved in the payment transaction; communicating, with at least one processor, data associated with a request for authorization of the payment transaction involving the merchant and the customer to the financial institution based on determining the identity of the financial institution; receiving, with at least one processor, an indication of whether the payment transaction involving the merchant and the customer was authorized from the financial institution; and communicating, with at least one processor, data associated with authorization of the payment transaction involving the merchant and the customer to the MPOS device.

According to some non-limiting embodiments or aspects, provided is a system for conducting a payment transaction involving payment on delivery in real-time. The system comprises at least one processor programmed or configured to receive transaction data associated with a payment transaction involving a merchant and a customer at a location that is independent of a merchant location from an MPOS device; determine an identity of a financial institution from among a plurality of financial institutions based on the transaction data associated with the payment transaction, wherein the financial institution is associated with the merchant involved in the payment transaction; communicate data associated with a request for authorization of the payment transaction involving the merchant and the customer to the financial institution based on determining the identity of the financial institution; receive an indication of whether the payment transaction involving the merchant and the customer was authorized from the financial institution; and communicate data associated with the authorization of the payment transaction involving the merchant and the customer to the MPOS device.

According to some non-limiting embodiments or aspects, provided is a computer program product for conducting a payment transaction involving payment on delivery in real-time. The computer program product comprises at least one non-transitory computer-readable medium including one or more instructions that, when executed by at least one processor, cause the at least one processor to receive transaction data associated with a payment transaction involving a merchant and a customer at a location that is independent of a merchant location from an MPOS device; determine an identity of a financial institution from among a plurality of financial institutions based on the transaction data associated with the payment transaction, wherein the financial institution is associated with the merchant involved in the payment transaction; communicate data associated with a request for authorization of the payment transaction involving the merchant and the customer to the financial institution based on determining the identity of the financial institution; receive an indication of whether the payment transaction involving the merchant and the customer was authorized from the financial institution; and communicate data associated with the authorization of the payment transaction involving the merchant and the customer to the MPOS device.

Further non-limiting embodiments or aspects are set forth in the following numbered clauses.

Clause 1: A computer-implemented method for conducting a payment transaction involving payment on delivery in real-time, the computer-implemented method comprising: receiving, with at least one processor, transaction data associated with a payment transaction involving a merchant and a customer at a location that is independent of a merchant location from an MPOS device; determining, with at least one processor, an identity of a financial institution from among a plurality of financial institutions based on the transaction data associated with the payment transaction, wherein the financial institution is associated with the merchant involved in the payment transaction; communicating, with at least one processor, data associated with a request for authorization of the payment transaction involving the merchant and the customer to the financial institution based on determining the identity of the financial institution; receiving, with at least processor, an indication of whether the payment transaction involving the merchant and the customer was authorized from the financial institution; and communicating, with at least one processor, data associated with authorization of the payment transaction involving the merchant and the customer to the MPOS device.

Clause 2: The computer-implemented method of clause 1, further comprising: determining merchant data associated with the merchant involved in the payment transaction, wherein, when determining the identity of the financial institution from among the plurality of financial institutions, the computer-implemented method comprises: determining, with at least one processor, the identity of the financial institution from among the plurality of financial institutions based on the merchant data associated with the merchant involved in the payment transaction.

Clause 3: The computer-implemented method of clause 1 or 2, wherein, determining the merchant data associated with the merchant involved in the payment transaction comprises: determining the merchant data associated with the merchant based on the transaction data associated with the payment transaction involving the merchant and the customer.

Clause 4: The computer-implemented method of any of clauses 1-3, wherein the financial institution is an acquirer associated with an account of the merchant involved in the payment transaction.

Clause 5: The computer-implemented method of any of clauses 1-4, wherein communicating the data associated with authorization of the payment transaction involving the merchant and the customer comprises: communicating the data associated with authorization of the payment transaction involving the merchant and the customer to the MPOS device after receiving an indication that the payment transaction involving the merchant and the customer was authorized from the financial institution.

Clause 6: The computer-implemented method of any of clauses 1-5, wherein receiving data associated with authorization of the payment transaction involving the merchant and the customer comprises: receiving data associated with authorization of the payment transaction involving the merchant and the customer from an acquirer associated with an account of the merchant involved in the payment transaction.

Clause 7: The computer-implemented method of any of clauses 1-6, further comprising: determining the data associated with authorization of the payment transaction involving the merchant and the customer was authorized based on receiving the indication of whether the payment transaction involving the merchant and the customer was authorized from the financial institution.

Clause 8: The computer-implemented method of any of clauses 1-7, further comprising: communicating data associated with a request for processing of the payment transaction involving the merchant and the customer, wherein, communicating data associated with a request for processing of the payment transaction involving the merchant and the customer comprises: communicating data associated with the request for authorization of the payment transaction involving the merchant and the customer.

Clause 9: The computer-implemented method of any of clauses 1-8, wherein receiving data associated with processing of the payment transaction involving the merchant and the customer comprises: receiving data associated with authorization of the payment transaction involving the merchant and the customer.

Clause 10: The computer-implemented method of any of clauses 1-9, further comprising: determining merchant identity data associated with the merchant involved in the payment transaction, wherein, determining the financial institution from among the plurality of financial institutions comprises: determining an acquirer of a plurality of acquirers based on the merchant identity data associated with the merchant involved in the payment transaction.

Clause 11: The computer-implemented method of any of clauses 1-10, wherein the transaction data associated with a payment transaction involving a merchant and a customer comprises: validation data associated with the payment transaction involving the merchant and the customer.

Clause 12: The computer-implemented method of any of clauses 1-11, wherein determining the identity of the financial institution from among the plurality of financial institutions based on the transaction data associated with the payment transaction comprises: validating a delivery entity associated with the MPOS device based on the validation data associated with the payment transaction involving the merchant and the customer.

Clause 13: The computer-implemented method of any of clauses 1-12, further comprising: generating a token for the payment transaction based on validating the delivery entity associated with the MPOS device, wherein the token comprises data associated with the identity of the financial institution.

Clause 14: The computer-implemented method of any of clauses 1-13, further comprising: communicating the token to the MPOS device based on generating the token; and receiving account data associated with an account of the customer and the token.

Clause 15: The computer-implemented method of any of clauses 1-14, wherein communicating data associated with a request for authorization of the payment transaction involving the merchant and the customer to the financial institution is based on the token.

Clause 16: The computer-implemented method of any of clauses 1-15, wherein the validation data comprises: data associated with an identification of a delivery entity associated with the MPOS device; data associated with an identification of the merchant involved in the payment transaction; and data associated with an encryption key of the delivery entity.

Clause 17: A system for conducting a payment transaction involving payment on delivery in real-time, the system comprising: at least one processor programmed or configured to: receive transaction data associated with a payment transaction involving a merchant and a customer at a location that is independent of a merchant location from an MPOS device; determine an identity of a financial institution from among a plurality of financial institutions based on the transaction data associated with the payment transaction, wherein the financial institution is associated with the merchant involved in the payment transaction; communicate data associated with a request for authorization of the payment transaction involving the merchant and the customer to the financial institution based on determining the identity of the financial institution; receive an indication of whether the payment transaction involving the merchant and the customer was authorized from the financial institution; and communicate data associated with authorization of the payment transaction involving the merchant and the customer to the MPOS device.

Clause 18: The system of clause 17, wherein the at least one processor is further programmed or configured to: determine merchant data associated with the merchant involved in the payment transaction, wherein, when determining the identity of the financial institution from among the plurality of financial institutions, the at least one processor is programmed or configured to: determine the identity of the financial institution from among the plurality of financial institutions based on the merchant data associated with the merchant involved in the payment transaction.

Clause 19: The system of clause 17 or 18, wherein, when determining the merchant data associated with the merchant involved in the payment transaction, the at least one processor is further programmed or configured to: determine the merchant data associated with the merchant based on the transaction data associated with the payment transaction involving the merchant and the customer.

Clause 20: The system of any of clauses 17-19, wherein the financial institution is an acquirer associated with an account of the merchant involved in the payment transaction.

Clause 21: The system of any of clauses 17-20, wherein, when communicating the data associated with authorization of the payment transaction involving the merchant and the customer, the at least one processor is further programmed or configured to: communicate the data associated with authorization of the payment transaction involving the merchant and the customer to the MPOS device after receiving an indication that the payment transaction involving the merchant and the customer was authorized from the financial institution.

Clause 22: The system of any of clauses 17-21, wherein, when receiving data associated with authorization of the payment transaction involving the merchant and the customer, the at least one processor is further programmed or configured to: receive data associated with authorization of the payment transaction involving the merchant and the customer from an acquirer associated with an account of the merchant involved in the payment transaction.

Clause 23: The system of any of clauses 17-22, wherein the at least one processor is further programmed or configured to: determine the data associated with authorization of the payment transaction involving the merchant and the customer was authorized based on receiving the indication of whether the payment transaction involving the merchant and the customer was authorized from the financial institution.

Clause 24: The system of any of clauses 17-23, wherein the at least one processor is further programmed or configured to: communicate data associated with a request for processing of the payment transaction involving the merchant and the customer, wherein, when communicating data associated with a request for processing of the payment transaction involving the merchant and the customer, the at least one processor is programmed or configured to: communicate data associated with the request for authorization of the payment transaction involving the merchant and the customer.

Clause 25: The system of any of clauses 17-24, wherein, when receiving data associated with processing of the payment transaction involving the merchant and the customer, the at least one processor is programmed or configured to: receive data associated with authorization of the payment transaction involving the merchant and the customer.

Clause 26: The system of any of clauses 17-25, wherein the at least one processor is further programmed or configured to: determine merchant identity data associated with the merchant involved in the payment transaction, wherein, when determining the financial institution from among the plurality of financial institutions, the at least one processor is programmed or configured to: determine an acquirer of a plurality of acquirers based on the merchant identity data associated with the merchant involved in the payment transaction.

Clause 27: The system of any of clauses 17-26, wherein the transaction data associated with a payment transaction involving a merchant and a customer comprises validation data associated with the payment transaction involving the merchant and the customer.

Clause 28: The system of any of clauses 17-27, wherein determining the identity of the financial institution from among the plurality of financial institutions based on the transaction data associated with the payment transaction comprises: validating a delivery entity associated with the MPOS device based on the validation data associated with the payment transaction involving the merchant and the customer.

Clause 29: The system of any of clauses 17-28, wherein the at least one processor is further programmed or configured to: generate a token for the payment transaction based on validating the delivery entity associated with the MPOS device, wherein the token comprises data associated with the identity of the financial institution.

Clause 30: The system of any of clauses 17-29, wherein the at least one processor is further programmed or configured to: communicate the token to the MPOS device based on generating the token; and receive account data associated with an account of the customer and the token.

Clause 31: The system of any of clauses 17-30, wherein communicating data associated with a request for authorization of the payment transaction involving the merchant and the customer to the financial institution is based on the token.

Clause 32: The system of any of clauses 17-31, wherein the validation data comprises: data associated with an identification of a delivery entity associated with the MPOS device; data associated with an identification of the merchant involved in the payment transaction; and data associated with an encryption key of the delivery entity.

Clause 33: A computer program product for conducting a payment transaction involving payment on delivery in real-time, the computer-program product comprising at least one non-transitory computer-readable medium including one or more instructions that, when executed by at least one processor, cause the at least one processor to: receive transaction data associated with a payment transaction involving a merchant and a customer at a location that is independent of a merchant location from an MPOS device; determine an identity of a financial institution from among a plurality of financial institutions based on the transaction data associated with the payment transaction, wherein the financial institution is associated with the merchant involved in the payment transaction; communicate data associated with a request for authorization of the payment transaction involving the merchant and the customer to the financial institution based on determining the identity of the financial institution; receive an indication of whether the payment transaction involving the merchant and the customer was authorized from the financial institution; and communicate data associated with authorization of the payment transaction involving the merchant and the customer to the MPOS device.

Clause 34: The computer-program product of clause 33, wherein the one or more instructions further cause the at least one processor to: determine merchant data associated with the merchant involved in the payment transaction, wherein, when determining the identity of the financial institution from among the plurality of financial institutions, the at least one processor is programmed or configured to: determine the identity of the financial institution from among the plurality of financial institutions based on the merchant data associated with the merchant involved in the payment transaction.

Clause 35: The computer-program product of clause 33 or 34, wherein the one or more instructions that cause the at least one processor to determine the merchant data associated with the merchant involved in the payment transaction cause the at least one processor to: determine the merchant data associated with the merchant based on the transaction data associated with the payment transaction involving the merchant and the customer.

Clause 36: The computer-program product of any of clauses 33-35, wherein the financial institution is an acquirer associated with an account of the merchant involved in the payment transaction.

Clause 37: The computer-program product of any of clauses 33-36, wherein the one or more instructions that cause the at least one processor to communicate the data associated with authorization of the payment transaction involving the merchant and the customer further cause the at least one processor to: communicate the data associated with authorization of the payment transaction involving the merchant and the customer to the MPOS device after receiving an indication that the payment transaction involving the merchant and the customer was authorized from the financial institution.

Clause 38: The computer-program product of any of clauses 33-37, wherein the one or more instructions that cause the at least one processor to receive data associated with authorization of the payment transaction involving the merchant and the customer further cause the at least one processor to: receive data associated with authorization of the payment transaction involving the merchant and the customer from an acquirer associated with an account of the merchant involved in the payment transaction.

Clause 39: The computer-program product of any of clauses 33-38, wherein the one or more instructions further cause the at least one processor to: determine the data associated with authorization of the payment transaction involving the merchant and the customer was authorized based on receiving the indication of whether the payment transaction involving the merchant and the customer was authorized from the financial institution.

Clause 40: The computer-program product of any of clauses 33-39, wherein the one or more instructions further cause the at least one processor to: communicate data associated with a request for processing of the payment transaction involving the merchant and the customer, wherein, when communicating data associated with a request for processing of the payment transaction involving the merchant and the customer, the at least one processor is programmed or configured to: communicate data associated with the request for authorization of the payment transaction involving the merchant and the customer.

Clause 41: The computer-program product of any of clauses 33-40, wherein the one or more instructions that cause the at least one processor to receive data associated with processing of the payment transaction involving the merchant and the customer further cause the at least one processor to: receive data associated with authorization of the payment transaction involving the merchant and the customer.

Clause 42: The computer-program product of any of clauses 33-41, wherein the one or more instructions further cause the at least one processor to: determine merchant identity data associated with the merchant involved in the payment transaction, wherein the one or more instructions that cause the at least one processor to determine the financial institution from among the plurality of financial institutions further cause the at least one processor to: determine an acquirer of a plurality of acquirers based on the merchant identity data associated with the merchant involved in the payment transaction.

Clause 43: The computer-program product of any of clauses 33-42, wherein the transaction data associated with a payment transaction involving a merchant and a customer comprises validation data associated with the payment transaction involving the merchant and the customer.

Clause 44: The computer-program product of any of clauses 33-43, wherein the one or more instructions that cause the at least one processor to determine the identity of the financial institution from among the plurality of financial institutions based on the transaction data associated with the payment transaction further causes the at least one processor to: validate a delivery entity associated with the MPOS device based on the validation data associated with the payment transaction involving the merchant and the customer.

Clause 45: The computer-program product of any of clauses 33-44, wherein the one or more instructions further cause the at least one processor to: generate a token for the payment transaction based on validating the delivery entity associated with the MPOS device, wherein the token comprises data associated with the identity of the financial institution.

Clause 46: The computer-program product of any of clauses 33-45, wherein the one or more instructions further cause the at least one processor to: communicate the token to the MPOS device based on generating the token; and receive account data associated with an account of the customer and the token.

Clause 47: The computer-program product of any of clauses 33-46, wherein communicating data associated with a request for authorization of the payment transaction involving the merchant and the customer to the financial institution is based on the token.

Clause 48: The computer-program product of any of clauses 33-47, wherein the validation data comprises: data associated with an identification of a delivery entity associated with the MPOS device; data associated with an identification of the merchant involved in the payment transaction; and data associated with an encryption key of the delivery entity.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
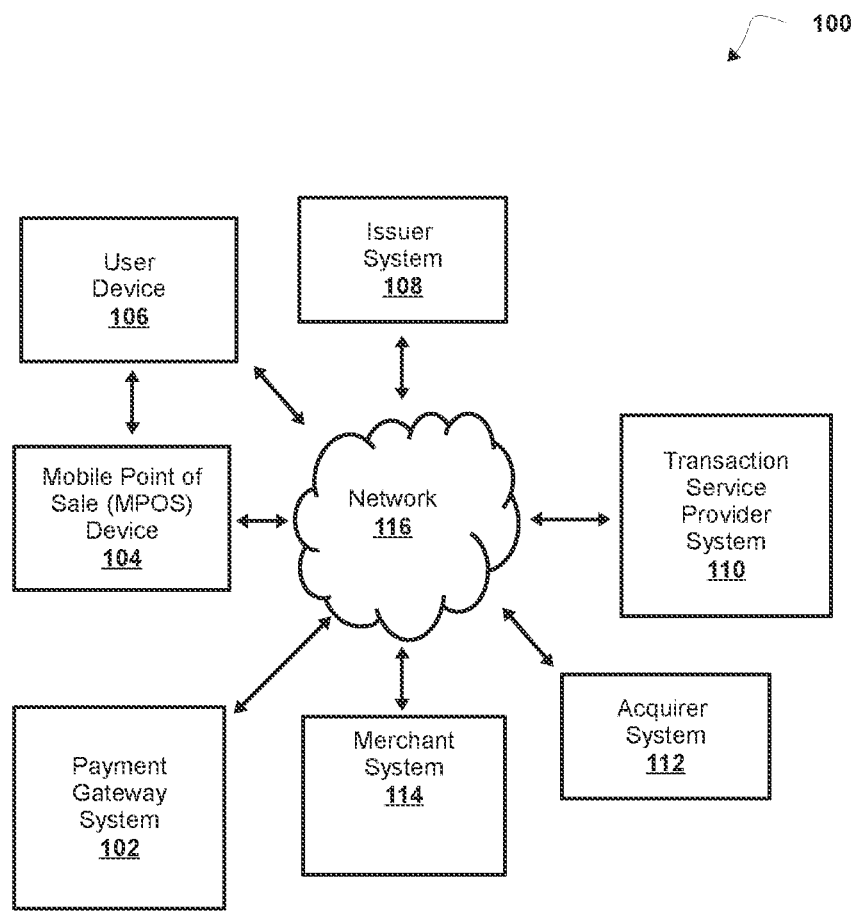
FIG. 1 is a diagram of some non-limiting embodiments or aspects of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "POS system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program and server-side software and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for conducting a payment transaction involving payment on delivery in real-time. In some non-limiting embodiments or aspects, a system may include at least one processor programmed or configured to receive transaction data associated with a payment transaction involving a merchant and a customer at a location that is independent of a merchant location from an MPOS device, determine an identity of a financial institution of a plurality of financial institutions based on the transaction data associated with the payment transaction, wherein the financial institution is associated with the merchant involved in the payment transaction, communicate data associated with a request for authorization of the payment transaction involving the merchant and the customer to the financial institution based on determining the identity of the financial institution, receive an indication of whether the payment transaction involving the merchant and the customer was authorized from the financial institution, and communicate data associated with authorization of the payment transaction involving the merchant and the customer to the MPOS device.

In this way, an entity that is not affiliated with a merchant (e.g., a third party entity, an independent company, and/or the like) may be able to conduct a payment transaction involving a payment on delivery for the merchant (e.g., using an MPOS device). In addition, an entity that is not affiliated with a first merchant or a second merchant may be able to conduct a payment transaction involving a payment on delivery for the first merchant or the second merchant (e.g., using an MPOS device).

Furthermore, in this way an entity (e.g., a logistics entity, a delivery entity, a courier, a sales representative, and/or the like) that is hired by the merchant to provide goods and/or sell services associated with the merchant and accept payment for the goods and/or the services may be able to conduct a payment transaction involving a payment on delivery for the merchant using the MPOS device in real-time. In addition, the entity may deliver a good and/or a service to the customer and obtain authorization for the payment transaction between the customer and the merchant for the good and/or service in real-time.

Referring now to FIG. 1, FIG. 1 is a diagram of an example environment 100 in which devices, systems, and/or methods, described herein, may be implemented. As shown in FIG. 1, environment 100 includes payment gateway system 102, MPOS device 104, user device 106, issuer system 108, transaction service provider system 110, acquirer system 112, merchant system 114, and network 116. Payment gateway system 102, MPOS device 104, user device 106, issuer system 108, transaction service provider system 110, acquirer system 112, and/or merchant system 114 may interconnect (e.g., establish a connection to communicate) via wired connections, wireless connections, or a combination of wired and wireless connections.

Payment gateway system 102 may include one or more devices capable of receiving information from MPOS device 104, user device 106, issuer system 108, transaction service provider system 110, acquirer system 112, and/or merchant system 114 and/or communicating information to MPOS device 104, user device 106, issuer system 108, transaction service provider system 110, acquirer system 112, and/or merchant system 114 via network 116. For example, payment gateway system 102 may include a computing device, such as a server (e.g., a transaction processing server), a group of servers, and/or other like devices. In some non-limiting embodiments or aspects, payment gateway system 102 may be associated with a payment gateway as described herein.

MPOS device 104 may include one or more devices capable of receiving information from payment gateway system 102, user device 106, issuer system 108, transaction service provider system 110, acquirer system 112, and/or merchant system 114 and/or communicating information to payment gateway system 102, user device 106, issuer system 108, transaction service provider system 110, acquirer system 112, and/or merchant system 114 via network 116. For example, MPOS device 104 may include a client device and/or the like. In some non-limiting embodiments or aspects, user device 106 may or may not be capable of receiving information (e.g., from user device 106) via a short range wireless communication connection (e.g., an NFC communication connection, an RFID communication connection, a Bluetooth® communication connection, and/or the like) and/or communicating information (e.g., to user device 106) via a short range wireless communication connection.

User device 106 may include one or more devices capable of receiving information from payment gateway system 102, MPOS device 104, issuer system 108, transaction service provider system 110, acquirer system 112, and/or merchant system 114 and/or communicating information to payment gateway system 102, MPOS device 104, issuer system 108, transaction service provider system 110, acquirer system 112, and/or merchant system 114 via network 116. For example, user device 106 may include a client device and/or the like. In some non-limiting embodiments or aspects, user device 106 may or may not be capable of receiving information (e.g., from MPOS device 104) via a short range wireless communication connection (e.g., an NFC communication connection, an RFID communication connection, a Bluetooth® communication connection, and/or the like) and/or communicating information (e.g., to MPOS device 104) via a short range wireless communication connection.

Issuer system 108 may include one or more devices capable of receiving information from payment gateway system 102, MPOS device 104, user device 106, transaction service provider system 110, acquirer system 112, and/or merchant system 114 and/or communicating information to payment gateway system 102, MPOS device 104, user device 106, transaction service provider system 110, acquirer system 112, and/or merchant system 114 via network 116. For example, issuer system 108 may include a computing device, such as a server, a group of servers, and/or other like devices. In some non-limiting embodiments or aspects, issuer system 108 may be associated with an issuer institution as described herein. For example, issuer system 108 may be associated with an issuer institution that issued a credit account, debit account, credit card account, debit card account, and/or the like to a user associated with user device 106.

Transaction service provider system 110 may include one or more devices capable of receiving information from payment gateway system 102, MPOS device 104, user device 106, issuer system 108, acquirer system 112, and/or merchant system 114 and/or communicating information to payment gateway system 102, MPOS device 104, user device 106, issuer system 108, acquirer system 112, and/or merchant system 114 via network 116. For example, transaction service provider system 110 may include a computing device, such as a server (e.g., a transaction processing server), a group of servers, and/or other like devices. In some non-limiting embodiments or aspects, transaction service provider system 110 may be associated with a transaction service provider as described herein. In some non-limiting embodiments or aspects, transaction service provider system 110 may be in communication with a data storage device, which may be local or remote to the transaction service provider system 110. In some non-limiting embodiments or aspects, transaction service provider system 110 may be capable of receiving information from, storing information in, communicating information to, or searching information stored in a data storage device.

Acquirer system 112 may include one or more devices capable of receiving information from payment gateway system 102, MPOS device 104, user device 106, issuer system 108, transaction service provider system 110, and/or merchant system 114 and/or communicating information to payment gateway system 102, MPOS device 104, user device 106, issuer system 108, transaction service provider system 110, and/or merchant system 114 via network 116. For example, acquirer system 112 may include a computing device, such as a server, a group of servers, and/or other like devices. In some non-limiting embodiments or aspects, acquirer system 112 may be associated with an acquirer as described herein.

Merchant system 114 may include one or more devices capable of receiving information from payment gateway system 102, MPOS device 104, user device 106, issuer system 108, transaction service provider system 110, and/or acquirer system 112 and/or communicating information to payment gateway system 102, MPOS device 104, user device 106, issuer system 108, transaction service provider system 110, and/or acquirer system 112 via network 116. For example, merchant system 114 may include a computing device, such as a server, a group of servers, and/or other like devices. Merchant system 114 may also include a device capable of receiving information from user device 106 via network 116, a communication connection (e.g., an NFC communication connection, an RFID communication connection, a Bluetooth® communication connection, and/or the like) with user device 106, and/or the like, and/or communicating information to user device 106 via the network, the communication connection, and/or the like. For example, merchant system 114 may include a computing device, such as a server, a group of servers, a client device, a group of client devices, and/or other like devices. In some non-limiting embodiments or aspects, merchant system 114 may be associated with a merchant as described herein. In some non-limiting embodiments or aspects, merchant system 114 may include one or more user devices 106. For example, merchant system 114 may include user device 106 that allows a merchant to communicate information to MPOS device 104. In some non-limiting embodiments or aspects, merchant system 114 may include one or more devices, such as computers, computer systems, and/or peripheral devices capable of being used by a merchant to conduct a payment transaction with a user. For example, merchant system 114 may include a POS device and/or a POS system.

Network 116 may include one or more wired and/or wireless networks. For example, network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
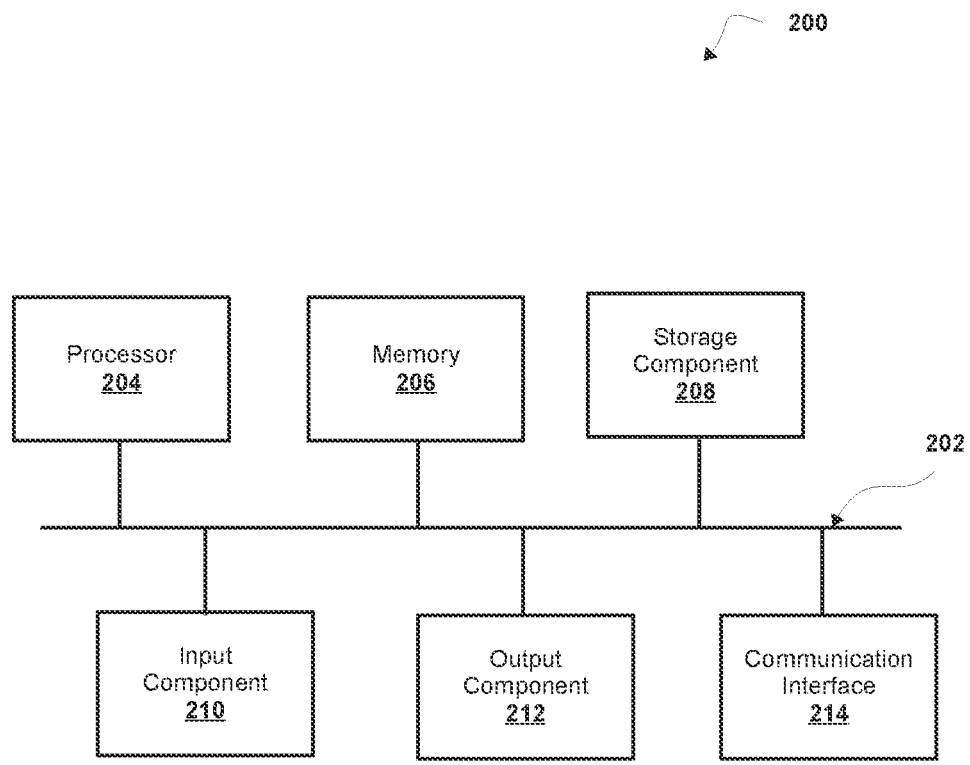
FIG. 2 is a diagram of some non-limiting embodiments or aspects of components of one or more devices of FIG. 1.

Referring now to FIG. 2, FIG. 2 is a diagram of example components of a device 200. Device 200 may correspond to payment gateway system 102 (e.g., one or more devices of payment gateway system 102), MPOS device 104, user device 106, issuer system 108 (e.g., one or more devices of issuer system 108), transaction service provider system 110 (e.g., one or more devices of transaction service provider system 110), acquirer system 112 (e.g., one or more devices of acquirer system 112), and/or merchant system 114 (e.g., one or more devices of merchant system 114). In some non-limiting embodiments or aspects, payment gateway system 102, MPOS device 104, user device 106, issuer system 108, transaction service provider system 110, acquirer system 112, and/or merchant system 114 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
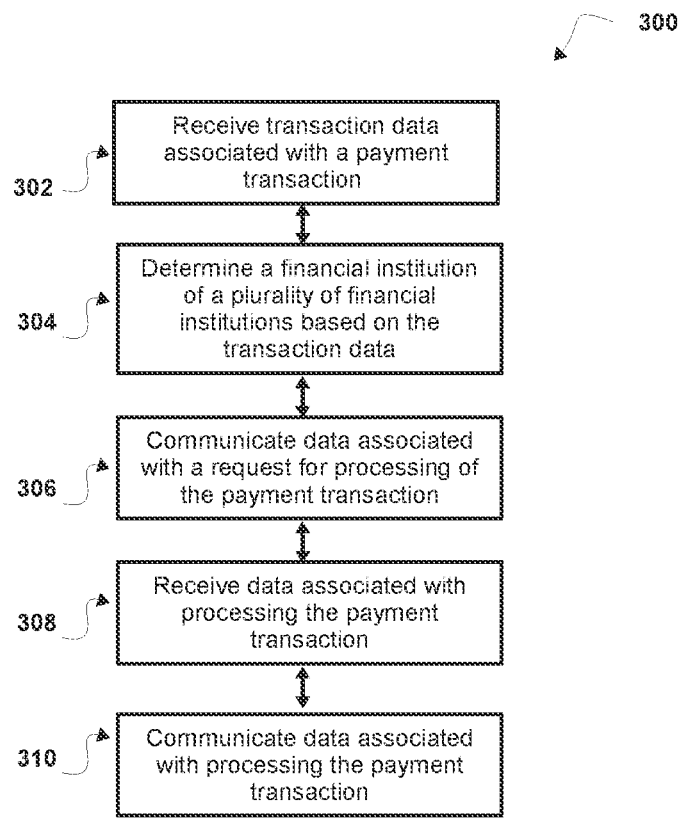
FIG. 3 is a flowchart of some non-limiting embodiments or aspects of a process for conducting a payment transaction involving payment on delivery.

Referring now to FIG. 3, FIG. 3 is a flowchart of some non-limiting embodiments or aspects of a process 300 for conducting a payment transaction involving payment on delivery. In some non-limiting embodiments or aspects, one or more of the steps of process 300 may be performed (e.g., completely, partially, etc.) by payment gateway system 102 (e.g., one or more devices of payment gateway system 102). In some non-limiting embodiments or aspects, one or more of the steps of process 300 may be performed (e.g., completely, partially, etc.) by another device or a group of devices separate from or including payment gateway system 102 (e.g., one or more devices of payment gateway system 102), MPOS device 104, user device 106, issuer system 108 (e.g., one or more devices of issuer system 108), transaction service provider system 110 (e.g., one or more devices of transaction service provider system 110), acquirer system 112 (e.g., one or more devices of acquirer system 112), and/or merchant system 114 (e.g., one or more devices of merchant system 114).

As shown in FIG. 3, at step 302, process 300 includes receiving transaction data associated with a payment transaction. For example, payment gateway system 102 may receive transaction data associated with a payment transaction involving a merchant and a customer from MPOS device 104.

In some non-limiting embodiments or aspects, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user data associated with the user involved in the payment transaction, merchant data associated with the merchant involved in the payment transaction, and/or issuer data associated with an issuer institution of an account involved in the payment transaction. In some non-limiting embodiments or aspects, user data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some non-limiting embodiments or aspects, merchant data may include merchant identity data associated with an identity of the merchant (e.g., a unique identifier of the merchant, a name of the merchant, and/or the like), merchant category data associated with at least one merchant category of the merchant (e.g., a code for a merchant category, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), and/or the like.

In some non-limiting embodiments or aspects, issuer data may include issuer institution identity data associated with the issuer that issued an account involved in the payment transaction (e.g., a unique identifier of the issuer institution, a name of the issuer, an issuer identification number (IIN) associated with the issuer, a BIN associated with the issuer, and/or the like), and/or the like.

In some non-limiting embodiments or aspects, transaction data associated with a payment transaction (e.g., each payment transaction of a plurality of payment transactions) may identify a merchant category of a merchant involved in the payment transaction. For example, transaction data associated with the payment transaction may include merchant data that identifies a merchant category of a merchant involved in the payment transaction. A merchant category may be information that is used to classify the merchant based on the type of goods or services the merchant provides. In some non-limiting embodiments or aspects, a payment transaction may involve a merchant that is associated with a merchant category of a plurality of merchant categories.

In some non-limiting embodiments or aspects, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time interval at which the payment transaction occurred.

In some non-limiting embodiments or aspects, payment gateway system 102 may receive validation data associated with a payment transaction involving a merchant and a customer at a location that is independent of a merchant location from MPOS device 104. For example, payment gateway system 102 may receive the validation data associated with the payment transaction involving a merchant and a customer at a customer location that is independent of a merchant location from MPOS device 104 based on MPOS device 104 scanning one or more packages provided by the merchant.

In some non-limiting embodiments or aspects, MPOS device 104 may determine validation data associated with a payment transaction involving a merchant and a customer. For example, MPOS device 104 may determine the validation data associated with the payment transaction involving the merchant and the customer based on reading (e.g., scanning, and/or the like) a label on a package that includes a good and/or information associated with a service provided by a merchant. In some non-limiting embodiments or aspects, MPOS device 104 may determine the validation data associated with the payment transaction involving the merchant and the customer based on reading a label on each package of a plurality of packages. For example, MPOS device 104 may determine the validation data associated with the payment transaction involving the merchant and the customer based on reading the label on each package of the plurality of packages, where each package includes a good and/or information associated with a service provided by a merchant. Each package may include a good and/or information associated with a service that is different from a good and/or information associated with a service in other packages.

In some non-limiting embodiments or aspects, the validation data may include data associated with an identification of a delivery entity associated with MPOS device 104, data associated with an identification of the merchant involved in the payment transaction, and/or data associated with encryption key (e.g., a private encryption key, a public encryption key, a symmetric encryption key, and/or the like) of the delivery entity. For example, the validation data may include a Courier Mobile Identification (CMID) associated with a delivery entity, a Terminal Identification (TID) associated with the MPOS device, a Merchant Mobile Identification (MMID) associated with the merchant involved in the payment transaction, and/or a Courier-Gateway key associated with the delivery entity.

In some non-limiting embodiments or aspects, payment gateway system 102 may validate a delivery entity associated with MPOS device 104 based on the validation data. For example, payment gateway system 102 may validate the delivery entity associated with MPOS device 104 based on data associated with an identification of a delivery entity associated with MPOS device 104, data associated with an identification of the merchant involved in the payment transaction, and/or data associated with encryption key of the delivery entity.

As further shown in FIG. 3, at step 304, process 300 includes determining a financial institution of a plurality of financial institutions based on the transaction data. For example, payment gateway system 102 may determine a financial institution (e.g., an acquirer associated with acquirer system 112) of a plurality of financial institutions (e.g., a plurality of acquirers) based on the transaction data. In some non-limiting embodiments or aspects, payment gateway system 102 may determine a financial institution of a plurality of financial institutions based on receiving the transaction data. For example, payment gateway system 102 may determine a financial institution of a plurality of financial institutions based on receiving the transaction data from MPOS device 104.

In some non-limiting embodiments or aspects, payment gateway system 102 may determine merchant data (e.g., merchant identity data) associated with the merchant involved in the payment transaction. For example, payment gateway system 102 may determine merchant data associated with the merchant involved in the payment transaction based on the transaction data associated with the payment transaction.

In some non-limiting embodiments or aspects, payment gateway system 102 may determine a financial institution of a plurality of financial institutions based on the merchant data associated with the merchant involved in the payment transaction. For example, payment gateway system 102 may determine an acquirer (e.g., an acquirer associated with acquirer system 112) of a plurality of acquirers based on the merchant identity data associated with the merchant involved in the payment transaction.

In some non-limiting embodiments or aspects, payment gateway system 102 may determine an identity of a financial institution of a plurality of financial institutions based on validation data associated with a payment transaction. For example, payment gateway system 102 may determine an identity of a financial institution associated with the merchant involved in the payment transaction based on the validation data associated with a payment transaction.

In some non-limiting embodiments or aspects, payment gateway system 102 may generate a token for the payment transaction based on validating a delivery entity associated with MPOS device 104. For example, payment gateway system 102 may generate the token for the payment transaction based on the validation data after validating the delivery entity associated with MPOS device 104. In some non-limiting embodiments or aspects, the token comprises data associated with the identity of the financial institution.

In some non-limiting embodiments or aspects, payment gateway system 102 may communicate the token to MPOS device 104. For example, payment gateway system 102 may communicate the token to MPOS device 104 based on generating the token. In some non-limiting embodiments or aspects, payment gateway system 102 may receive account data associated with an account of the customer and the token. For example, payment gateway system 102 may receive account data associated with an account of the customer and the token from MPOS device 104 based on MPOS device 104 receiving the account data associated with the account of the customer.

As further shown in FIG. 3, at step 306, process 300 includes communicating data associated with a request for processing of the payment transaction. For example, payment gateway system 102 may communicate data associated with a request for processing of the payment transaction to issuer system 108, transaction service provider system 110, acquirer system 112, and/or merchant system 114. In some non-limiting embodiments or aspects, payment gateway system 102 may communicate data associated with a request for processing of the payment transaction to issuer system 108, transaction service provider system 110, acquirer system 112, and/or merchant system 114 based on determining a financial institution of a plurality of financial institutions.

In some non-limiting embodiments or aspects, payment gateway system 102 may communicate data associated with a request for authorization of the payment transaction involving the merchant and the customer. For example, payment gateway system 102 may communicate data associated with a request for authorization of the payment transaction involving the merchant and the customer based on determining a financial institution of a plurality of financial institutions. In some non-limiting embodiments or aspects, payment gateway system 102 may communicate data associated with a request for authorization of the payment transaction involving the merchant and the customer to issuer system 108, transaction service provider system 110, acquirer system 112, and/or merchant system 114.

In some non-limiting embodiments or aspects, payment gateway system 102 may communicate data associated with a request for processing of the payment transaction based on validation data associated with the payment transaction. For example, payment gateway system 102 may communicate data associated with a request for processing of the payment transaction based on validation data associated with the payment transaction, where the validation data is associated with a package of a plurality of packages that includes a good and/or information associated with a service provided by a merchant.

As further shown in FIG. 3, at step 308, process 300 includes receiving data associated with processing the payment transaction. For example, payment gateway system 102 may receive data associated with processing the payment transaction from issuer system 108, transaction service provider system 110, acquirer system 112, and/or merchant system 114. In some non-limiting embodiments or aspects, payment gateway system 102 may receive data associated with processing the payment transaction, where the data associated with processing the payment transaction may include an indication that the payment transaction was or was not authorized. For example, payment gateway system 102 may receive data associated with processing the payment transaction, where the data associated with processing the payment transaction may include an indication of whether the payment transaction was authorized (e.g., an indication that the payment transaction was authorized or an indication that the payment transaction was not authorized) by issuer system 108 and/or acquirer system 112.

In some non-limiting embodiments or aspects, payment gateway system 102 may receive data associated with authorization of the payment transaction (e.g., data associated with an authorization message communicated during processing of the payment transaction) involving the merchant and the customer. For example, payment gateway system 102 may receive data associated with authorization of the payment transaction involving the merchant and the customer from acquirer system 112, where acquirer system 112 is associated with an account of the merchant involved in the payment transaction.

In some non-limiting embodiments or aspects, payment gateway system 102 may communicate data associated with a request for authorization of a payment transaction involving a merchant and a customer to a financial institution (e.g., a financial institution associated with merchant system 114) based on a token. For example, payment gateway system 102 may communicate data associated with a request for authorization of a payment transaction involving a merchant and a customer to a financial institution based on the token after receiving account data associated with an account of the customer and the token from MPOS device 104.

In some non-limiting embodiments or aspects, payment gateway system 102 may receive data associated with authorization of the payment transaction based on validation data associated with the payment transaction. For example, payment gateway system 102 may receive data associated with authorization of the payment transaction based on validation data associated with the payment transaction, where the validation data is associated with a package of a plurality of packages that includes a good and/or information associated with a service provided by a merchant.

As further shown in FIG. 3, at step 310, process 300 includes communicating data associated with processing the payment transaction. For example, payment gateway system 102 may communicate data associated with processing the payment transaction. In some non-limiting embodiments or aspects, payment gateway system 102 may communicate data associated with processing the payment transaction to MPOS device 104, user device 106, issuer system 108, transaction service provider system 110, acquirer system 112, and/or merchant system 114. For example, payment gateway system 102 may communicate data associated with processing the payment transaction to MPOS device 104, user device 106, issuer system 108, transaction service provider system 110, acquirer system 112, and/or merchant system 114 based on receiving the data associated with processing the payment transaction.

In some non-limiting embodiments or aspects, payment gateway system 102 may communicate data associated with processing the payment transaction, where the data associated with processing the payment transaction may include an indication that the payment transaction was or was not authorized by issuer system 108 and/or acquirer system 112.

In some non-limiting embodiments or aspects, payment gateway system 102 may communicate data associated with authorization of the payment transaction involving the merchant and the customer to MPOS device 104. For example, payment gateway system 102 may communicate data associated with authorization of the payment transaction involving the merchant and the customer to MPOS device 104 based on receiving the data associated with processing the payment transaction from acquirer system 112.

Figure 4:
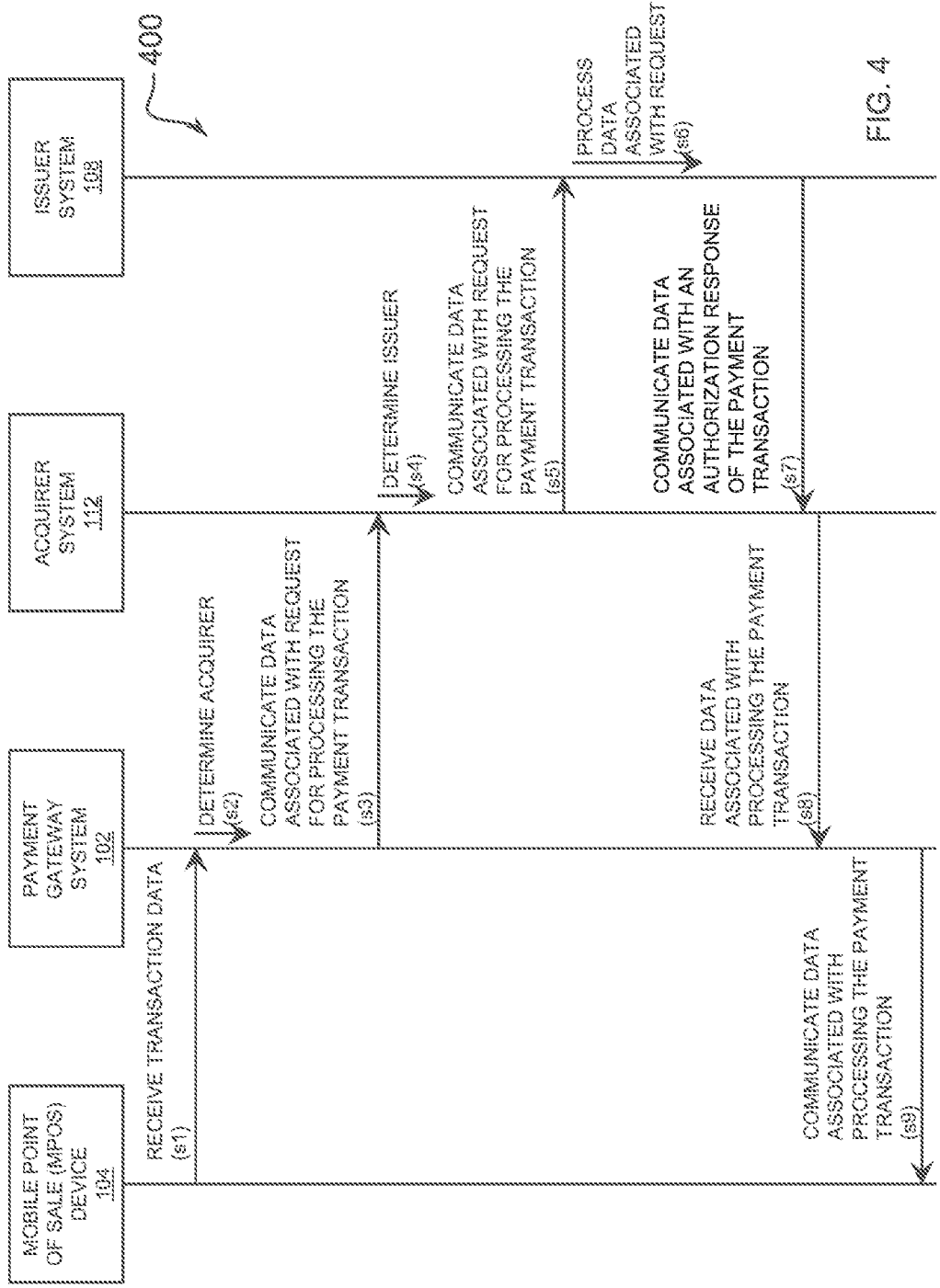
FIG. 4 is a sequence diagram of some non-limiting embodiments or aspects of the process shown in FIG. 3.

Referring now to FIG. 4, FIG. 4 is a sequence diagram of some non-limiting embodiments or aspects of a process 400 for conducting a payment transaction involving payment on delivery in real-time. As shown, one or more of the steps of process 400 are performed (e.g., completely, partially, and/or the like) by payment gateway system 102, MPOS device 104, user device 106, issuer system 108, and/or acquirer system 112. Additionally or alternatively, one or more of the steps of process 400 may be performed (e.g., completely, partially, and/or the like) by another device or group of devices separate from or including user device 106, transaction service provider system 110, and/or merchant system 114.

As shown in FIG. 4, at step s1, payment gateway system 102 may receive transaction data associated with a payment transaction. For example, payment gateway system 102 may receive transaction data associated with a payment transaction communicated from MPOS device 104. In some non-limiting embodiments or aspects, MPOS device 104 may communicate the transaction data associated with the payment transaction in response to receiving communication of the transaction data associated with the payment transaction (e.g., from user device 106). The transaction data may include transaction amount data associated with an amount of the payment transaction, transaction time data associated with a time interval at which the payment transaction occurred, transaction type data associated with a transaction type of the payment transaction, and/or the like. In some non-limiting embodiments or aspects, transaction data may include account data associated with an account of a customer. In some non-limiting embodiments or aspects, payment gateway system 102 may receive a token associated with a credit and/or debit account of a user. For example, the token may be included with the transaction data associated with the payment transaction.

As further shown in FIG. 4, at step s2, payment gateway system 102 may determine an acquirer associated with acquirer system 112. In some non-limiting embodiments or aspects, payment gateway system 102 may determine the acquirer associated with acquirer system 112 based on the transaction data associated with the payment transaction. In some non-limiting embodiments or aspects, payment gateway system 102 may determine a financial institution of a plurality of financial institutions. For example, payment gateway system 102 may determine a financial institution of a plurality of financial institutions based on the transaction data. In some non-limiting embodiments or aspects, the acquirer and/or financial institution may be determined based on receiving the transaction data associated with the payment transaction from MPOS device 104. In some non-limiting embodiments or aspects, payment gateway system 102 may determine a merchant associated with a merchant system 114. For example, payment gateway system 102 may determine a merchant associated with a merchant system 114 based on the transaction data associated with the payment transaction.

In some non-limiting embodiments or aspects, payment gateway system 102 may generate a token associated with the payment transaction. For example, upon validation of a delivery entity associated with MPOS device 104, payment gateway system 102 may generate a token associated with the payment transaction. In some non-limiting embodiments or aspects, the token may comprise data associated with the identity of the acquirer and/or the financial institution of the plurality of financial institutions. In some non-limiting embodiments or aspects, payment gateway system 102 may communicate the token to MPOS device 104. Based on communication of the token to MPOS device 104, payment gateway system 102 may receive account data associated with an account of a customer and the token from MPOS device 104.

As further shown in FIG. 4, at step s3, payment gateway system 102 may communicate data associated with a request for processing of the payment transaction. For example, payment gateway system 102 may communicate the data associated with the request for processing the payment transaction to acquirer system 112. In some non-limiting embodiments or aspects, payment gateway system 102 may communicate the data associated with the request for processing the payment transaction to issuer system 108, transaction service provider system 110, and/or merchant system 114. In some non-limiting embodiments or aspects, payment gateway system 102 may communicate data associated with the request for processing of the payment transaction to issuer system 108, transaction service provider system 110, acquirer system 112, and/or merchant system 114 based on determining an acquirer associated with acquirer system 112, a merchant associated with merchant system 114, and/or a financial institution of a plurality of financial institutions. In some non-limiting embodiments or aspects, payment gateway system 102 may communicate data associated with a request for processing the payment transaction based on the token. For example, payment gateway system 102 may communicate data associated with the request for processing the payment transaction to acquirer system 112 and/or a financial institution based on the token. In some non-limiting embodiments or aspects, payment gateway system 102 may communicate data associated with the request for authorization based on the token after receiving account data associated with an account of the customer and the token from MPOS device 104.

As further shown in FIG. 4, at step s4, acquirer system 112 may determine an issuer associated with issuer system 108. In some non-limiting embodiments or aspects, acquirer system 112 may determine the issuer associated with issuer system 108 based on the transaction data associated with the payment transaction. In some non-limiting embodiments or aspects, acquirer system 112 may determine the issuer associated with issuer system 108 based on the data associated with a request for processing of the payment transaction. For example, acquirer system 112 may determine an issuer corresponding to the acquirer based on the transaction data. In some non-limiting embodiments or aspects, the issuer may be determined based on receiving the data associated with a request for processing of the payment transaction from payment gateway system 102. In some non-limiting embodiments or aspects, acquirer system 112 may determine the issuer based on the token for the payment transaction. For example, upon validation of a delivery entity associated with MPOS device 104, payment gateway system 102 may communicate the token generated by the payment gateway system 102 to acquirer system 112 for the payment transaction. In some non-limiting embodiments or aspects, the token may comprise data associated with the identity of the issuer corresponding to the acquirer.

As further shown in FIG. 4, at step s5, acquirer system 112 may communicate data associated with a request for processing of the payment transaction. For example, acquirer system 112 may communicate data associated with the request for processing the payment transaction to issuer system 108. In some non-limiting embodiments or aspects, acquirer system 112 may communicate data associated with a request for processing of the payment transaction to payment gateway system 102, issuer system 108, transaction service provider system 110, and/or merchant system 114. In some non-limiting embodiments or aspects, data associated with a request for processing of the payment transaction may include transaction data associated with the payment transaction, account data associated with an account of a customer, the token, and/or the like.

As further shown in FIG. 4, at step s6, issuer system 108 may process data associated with a request for processing of the payment transaction. In some non-limiting embodiments or aspects, issuer system 108 may determine an authorization response based on data associated with a request for processing of the payment transaction. For example, issuer system 108 may determine an account associated with a customer that has funds greater than or equal to an amount of the payment transaction. In response to determining the account associated with the customer that has funds greater than or equal to an amount of the payment transaction, issuer system 108 may determine an authorization response indicating the payment transaction is approved. In some non-limiting embodiments or aspects, issuer system 108 may determine an account associated with a customer that does not have funds greater than or equal to an amount of the payment transaction. In response to determining the account associated with the customer does not have funds greater than or equal to an amount of the payment transaction, issuer system 108 may determine an authorization response indicating the payment transaction is not approved.

As further shown in FIG. 4, at step s7, issuer system 108 may communicate data associated with an authorization response of the payment transaction. In some non-limiting embodiments or aspects, issuer system 108 may communicate data associated with an authorization response of the payment transaction to acquirer system 112. For example, in response to determining the authorization response, issuer system 108 may communicate the authorization response to acquirer system 112 indicating that the payment transaction is approved or not approved. In some non-limiting embodiments or aspects, issuer system 108 may communicate data associated with an authorization response of the payment transaction to payment gateway system 102, transaction service provider system 110, and/or merchant system 114.

As further shown in FIG. 4, at step s8, payment gateway system 102 may receive data associated with processing the payment transaction. For example, payment gateway system 102 may receive data associated with processing the payment transaction from acquirer system 112. In some non-limiting embodiments or aspects, payment gateway system 102 may receive data associated with processing the payment transaction from issuer system 108, transaction service provider system 110, and/or merchant system 114. In some non-limiting embodiments or aspects, payment gateway system 102 may receive data associated with processing the payment transaction, where the data associated with processing the payment transaction includes an indication of whether the payment transaction was authorized. In some non-limiting embodiments or aspects, the data associated with processing the payment transaction from issuer system 108 may be associated with the token communicated to the financial institution and/or the issuer system 108.

As further shown in FIG. 4, at step s9, payment gateway system 102 may communicate data associated with processing the payment transaction. For example, payment gateway system 102 may communicate data associated with processing the payment transaction to MPOS device 104. In some non-limiting embodiments or aspects, payment gateway system 102 may communicate data associated with processing the payment transaction to user device 106, issuer system 108, transaction service provider system 110, acquirer system 112, and/or merchant system 114. In some non-limiting embodiments or aspects, payment gateway system 102 may communicate data associated with authorization of the payment transaction involving the merchant and the customer. For example, payment gateway system 102 may communicate data associated with authorization of the payment transaction involving the merchant and the customer to MPOS device 104 based on receiving data associated with processing the payment transaction from issuer system 108. In some non-limiting embodiments or aspects, payment gateway system 102 may communicate data associated with authorization of the payment transaction involving the merchant and the customer based on receiving the data associated with processing the payment transaction from user device 106, issuer system 108, transaction service provider system 110, acquirer system 112, and/or merchant system 114. In some non-limiting embodiments or aspects, payment gateway system 102 may communicate data associated with processing the payment transaction comprising the token.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for conducting a payment transaction involving payment on delivery in real-time, the system comprising:
   at least one processor programmed or configured to:
      receive transaction data associated with a payment transaction involving a merchant and a customer at a location that is independent of a merchant location from a mobile-point-of-sale (MPOS) device, wherein the transaction data associated with the payment transaction involving the merchant and the customer comprises validation data associated with the payment transaction involving the merchant and the customer;
      determine an identity of a financial institution from among a plurality of financial institutions based on the transaction data associated with the payment transaction, wherein the financial institution is associated with the merchant involved in the payment transaction;
      validating a delivery entity associated with the MPOS device based on the validation data associated with the payment transaction involving the merchant and the customer;
      generate a token for the payment transaction based on validating the delivery entity associated with the MPOS device, wherein the token comprises data associated with the identity of the financial institution;
      communicate the token to the MPOS device based on generating the token;
      receive account data associated with an account of the customer and the token;
      communicate data associated with a request for authorization of the payment transaction involving the merchant and the customer to the financial institution based on the token; and
      communicate data associated with authorization of the payment transaction involving the merchant and the customer to the MPOS device.

2. The system of claim 1, wherein the at least one processor is further programmed or configured to:
   determine merchant data associated with the merchant involved in the payment transaction,
   wherein, when determining the identity of the financial institution from among the plurality of financial institutions, the at least one processor is programmed or configured to:
      determine the identity of the financial institution from among the plurality of financial institutions based on the merchant data associated with the merchant involved in the payment transaction.

3. The system of claim 2, wherein, when determining the merchant data associated with the merchant involved in the payment transaction, the at least one processor is further programmed or configured to:
   determine the merchant data associated with the merchant based on the transaction data associated with the payment transaction involving the merchant and the customer.

4. The system of claim 1, wherein the financial institution is an acquirer associated with an account of the merchant involved in the payment transaction.

5. The system of claim 1, wherein, when communicating the data associated with authorization of the payment transaction involving the merchant and the customer, the at least one processor is programmed or configured to:
   communicate the data associated with authorization of the payment transaction involving the merchant and the customer to the MPOS device after receiving an indication that the payment transaction involving the merchant and the customer was authorized from the financial institution.

6. The system of claim 1, wherein, when receiving data associated with authorization of the payment transaction involving the merchant and the customer, the at least one processor is programmed or configured to:
   receive data associated with authorization of the payment transaction involving the merchant and the customer from an acquirer associated with an account of the merchant involved in the payment transaction.

7. The system of claim 1, wherein the at least one processor is further programmed or configured to:
   determine the data associated with authorization of the payment transaction involving the merchant and the customer was authorized based on receiving an indication of whether the payment transaction involving the merchant and the customer was authorized from the financial institution.

8. A computer-implemented method for conducting a payment transaction involving payment on delivery in real-time, the computer-implemented method comprising:
   receiving, with at least one processor, transaction data associated with a payment transaction involving a merchant and a customer at a location that is independent of a merchant location from a mobile-point-of-sale (MPOS) device, wherein the transaction data associated with the payment transaction involving the merchant and the customer comprises validation data associated with the payment transaction involving the merchant and the customer;

determining, with at least one processor, an identity of a financial institution from among a plurality of financial institutions based on the transaction data associated with the payment transaction, wherein the financial institution is associated with the merchant involved in the payment transaction;

validating, with at least one processor, a delivery entity associated with the MPOS device based on the validation data associated with the payment transaction involving the merchant and the customer;

generating, with at least one processor, a token for the payment transaction based on validating the delivery entity associated with the MPOS device, wherein the token comprises data associated with the identity of the financial institution;

communicating, with at least one processor, the token to the MPOS device based on generating the token;

receiving, with at least one processor, account data associated with an account of the customer and the token;

communicating, with at least one processor, data associated with a request for authorization of the payment transaction involving the merchant and the customer to the financial institution based on the token; and communicating, with at least one processor, data associated with authorization of the payment transaction involving the merchant and the customer to the MPOS device.

9. The computer-implemented method of claim 8, further comprising:

determining merchant data associated with the merchant involved in the payment transaction, wherein determining the identity of the financial institution from among the plurality of financial institutions comprises:

determining the identity of the financial institution from among the plurality of financial institutions based on the merchant data associated with the merchant involved in the payment transaction.

10. The computer-implemented method of claim 9, wherein determining the merchant data associated with the merchant involved in the payment transaction comprises:

determining the merchant data associated with the merchant based on the transaction data associated with the payment transaction involving the merchant and the customer.

11. The computer-implemented method of claim 8, wherein the financial institution is an acquirer associated with an account of the merchant involved in the payment transaction.

12. The computer-implemented method of claim 8, wherein communicating the data associated with authorization of the payment transaction involving the merchant and the customer comprises:

communicating the data associated with authorization of the payment transaction involving the merchant and the customer to the MPOS device after receiving an indication that the payment transaction involving the merchant and the customer was authorized from the financial institution.

13. The computer-implemented method of claim 8, wherein receiving data associated with authorization of the payment transaction involving the merchant and the customer comprises:

receiving data associated with authorization of the payment transaction involving the merchant and the customer from an acquirer associated with an account of the merchant involved in the payment transaction.

14. The computer-implemented method of claim 8, further comprising:

determining the data associated with authorization of the payment transaction involving the merchant and the customer was authorized based on receiving an indication of whether the payment transaction involving the merchant and the customer was authorized from the financial institution.

15. A computer program product for conducting a payment transaction involving payment on delivery in real-time, the computer program product comprising at least one non-transitory computer-readable medium including one or more instructions that, when executed by at least one processor, cause the at least one processor to:

receive transaction data associated with a payment transaction involving a merchant and a customer at a location that is independent of a merchant location from a mobile-point-of-sale (MPOS) device, wherein the transaction data associated with the payment transaction involving the merchant and the customer comprises validation data associated with the payment transaction involving the merchant and the customer;

determine an identity of a financial institution from among a plurality of financial institutions based on the transaction data associated with the payment transaction, wherein the financial institution is associated with the merchant involved in the payment transaction;

validating a delivery entity associated with the MPOS device based on the validation data associated with the payment transaction involving the merchant and the customer;

generate a token for the payment transaction based on validating the delivery entity associated with the MPOS device, wherein the token comprises data associated with the identity of the financial institution;

communicate the token to the MPOS device based on generating the token;

receive account data associated with an account of the customer and the token;

communicate data associated with a request for authorization of the payment transaction involving the merchant and the customer to the financial institution based on the token; and communicate data associated with authorization of the payment transaction involving the merchant and the customer to the MPOS device.

16. The computer program product of claim 15, wherein the one or more instructions further cause the at least one processor to:

determine merchant data associated with the merchant involved in the payment transaction;

wherein the one or more instructions that cause the at least one processor to determine the identity of the financial institution from among the plurality of financial institutions, cause the at least one processor to:

determine the identity of the financial institution from among the plurality of financial institutions based on the merchant data associated with the merchant involved in the payment transaction.

17. The computer program product of claim 16, wherein the one or more instructions that cause the at least one processor to determine the merchant data associated with the merchant involved in the payment transaction, cause the at least one processor to:
- determine the merchant data associated with the merchant based on the transaction data associated with the payment transaction involving the merchant and the customer.

18. The computer program product of claim 15, wherein the financial institution is an acquirer associated with an account of the merchant involved in the payment transaction.

19. The computer program product of claim 15, wherein the one or more instructions that cause the at least one processor to communicate the data associated with authorization of the payment transaction involving the merchant and the customer, cause the at least one processor to:
- communicate the data associated with authorization of the payment transaction involving the merchant and the customer to the MPOS device after receiving an indication that the payment transaction involving the merchant and the customer was authorized from the financial institution.

20. The computer program product of claim 15, wherein the one or more instructions that cause the at least one processor to receive data associated with authorization of the payment transaction involving the merchant and the customer, cause the at least one processor to:
- receive data associated with authorization of the payment transaction involving the merchant and the customer from an acquirer associated with an account of the merchant involved in the payment transaction.

\* \* \* \* \*